(12) United States Patent
Okumura

(10) Patent No.: US 7,796,177 B2
(45) Date of Patent: Sep. 14, 2010

(54) DIGITAL CAMERA AND CONTROLLING METHOD FOR DIGITAL CAMERA

(75) Inventor: Yoichiro Okumura, Hino (JP)

(73) Assignee: Olympus Imaging Corp., Tokyo (JP)

( * ) Notice: Subject to any disclaimer, the term of this patent is extended or adjusted under 35 U.S.C. 154(b) by 436 days.

(21) Appl. No.: 11/818,484

(22) Filed: Jun. 13, 2007

(65) Prior Publication Data

US 2008/0007643 A1  Jan. 10, 2008

(30) Foreign Application Priority Data

Jun. 26, 2006 (JP) ............................. 2006-175628
Apr. 11, 2007 (JP) ............................. 2007-103736

(51) Int. Cl.
 *H04N 5/222* (2006.01)
(52) U.S. Cl. ............................... 348/333.01; 348/222.1
(58) Field of Classification Search ............ 348/333.01, 348/333.11, 333.12, 296, 222.1
See application file for complete search history.

(56) References Cited

U.S. PATENT DOCUMENTS

| 2003/0156212 A1* | 8/2003 | Kingetsu et al. | 348/333.12 |
| 2004/0061797 A1* | 4/2004 | Takahashi et al. | 348/333.01 |
| 2005/0052553 A1* | 3/2005 | Kido et al. | 348/296 |
| 2006/0104628 A1* | 5/2006 | Hasegawa et al. | 396/287 |
| 2006/0176387 A1* | 8/2006 | Kobayashi | 348/333.01 |
| 2009/0096902 A1* | 4/2009 | Kobayashi | 348/296 |

FOREIGN PATENT DOCUMENTS

| JP | 2004-015595 | | 1/2004 |
| JP | 2005130111 | * | 5/2005 |
| JP | 2005-260733 | | 9/2005 |

OTHER PUBLICATIONS

First Office Action for Chinese Patent Application No. 2007101126100, mailed Dec. 5, 2008 (5 pgs.) with translation (6 pgs.).
Second Office Action for Chinese Patent Application No. 2007101126100, mailed Jul. 3, 2009 (6 pgs.) with translation (5 pgs.).
Machine Translation of JP-2005-260733 (previously submitted as Reference AB).

* cited by examiner

*Primary Examiner*—Gevell Selby
(74) *Attorney, Agent, or Firm*—Straub & Pokotylo; John C. Pokotylo

(57) ABSTRACT

A CCD for receiving subject light flux that has passed through a photographing lens and outputting subject image signals, and a rear liquid crystal monitor for displaying a moving image of the subject based on the subject image signals, and a release button that is operated in order to instruct execution of an exposure operation are provided, wherein live view display is performed on the rear liquid crystal monitor at a first update cycle until the release button is pressed down halfway, and live view display is performed on the liquid crystal monitor at a second cycle that is shorter than the first update cycle after the release button has been pressed down halfway.

11 Claims, 7 Drawing Sheets

DIGITAL CAMERA AND CONTROLLING METHOD FOR DIGITAL CAMERA

Benefit is claimed, under 35 U.S.C. §119, to the filing date of prior Japanese Patent Applications No. 2006-175628, filed on Jun. 26, 2006, and No. 2007-103736, filed on Apr. 11, 2007. These applications are expressly incorporated herein by reference. The scope of the present invention is not limited to any requirements of the specific embodiments described in the application.

BACKGROUND OF THE INVENTION

1. Field of the Invention

The present invention relates to a digital camera having a live view display function, and to a control method for a digital camera, and in detail relates to a digital camera having a so-called Live View function (also called an Electronic Viewfinder Function) for displaying an image acquired by image sensors as a moving image on a display unit, and to a control method for such a camera.

2. Description of the Related Art

In a conventional digital camera, observation of a subject image is performed using an optical viewfinder. However, recent digital cameras utilize display of output of an image sensor, provided for storage of subject image data, either without an optical viewfinder or together with an optical viewfinder. Specifically, it has become common to have a live view function where an image acquired by an image sensor is displayed using a display device such as a liquid crystal monitor for observation of a subject image.

In the case of a digital camera having this type of live view display function, the amount of subject image data acquired by the image sensor increases, and further if the number of times the image sensor is read per unit time period is increased, the internal power consumption increases. As a means of dealing with this situation, a digital camera has been proposed, in Japanese patent laid-open No. 2004-15595 (laid-open Jan. 15, 2004) in which a frame rate is switched depending on an exposure mode, detected battery voltage, etc. Also, Japanese patent laid-open No. 2005-260733 (laid-open Sep. 22, 2005) discloses a digital camera in which, as a measure to deal with flicker caused at the frequency of the mains power supply, namely 50 Hz or 60 Hz, in a standby state image data is read from the image sensor at a high frame rate, and switched to a low frame rate when the release button is pressed down halfway.

SUMMARY OF THE INVENTION

The present invention has been conceived in view of this type of situation, and has as an object to provide a digital camera with which it is made easy seize photo opportunities while reducing power consumption.

Live view display in a digital camera of the present invention is configured such that live view display is performed at a first update cycle until a manual operation member is operated, and live view display is carried out at a second update cycle that is shorter than the first update cycle after the manual operation.

DETAILED DESCRIPTION OF THE PREFERRED EMBODIMENTS

Figure 1:
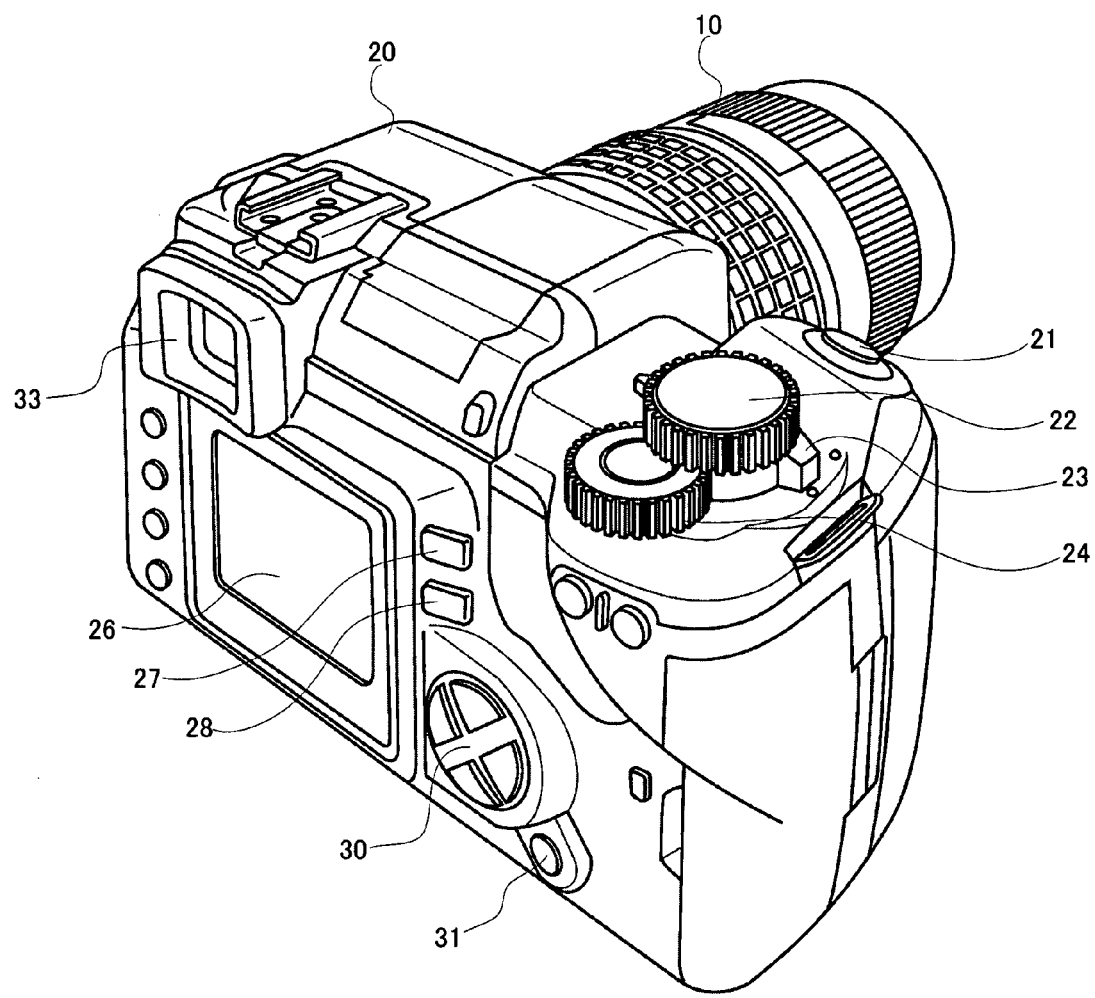
FIG. 1 is an external perspective drawing looking at a digital camera of a first embodiment of the present invention from a rear surface.

In the following, a preferred embodiment using a digital camera adopting the present invention will be described using the drawings. FIG. 1 is an external perspective drawing of a digital camera relating to a first embodiment of the present invention seen from behind. This camera is comprised of a camera body 20 and a lens barrel 10 as an interchangeable lens. The lens barrel 10 is removably attached to a mount opening section (not shown) on the front of the camera body 20. Subject light flux that is formed by a photographing lens comprised of lenses 101a, 101b etc. (refer to FIG. 2) within the lens barrel 10 is guided into the camera body 20 by means of the mount opening section. Within this embodiment, the lens barrel 10 and the camera body 20 are constructed separately, and are electrically connected by means of a communication contact 300 (refer to FIG. 2). Also, an attachment/removal sensor switch 259 (refer to FIG. 2) provided on the camera body 20 functions to detect an attachment state of the lens barrel 10 with respect to the camera body 20.

A release button 21, mode dial 22, power switch lever 23 and control dial 24 etc. are arranged on the upper surface of the camera body 20. The release button 21 has a first release switch that turns on if the photographer presses the button down halfway, and a second release switch that is turned on when the button is pressed down fully. By turning this first release switch (hereafter called 1R) on, the camera carries out exposure preparation operations such as focal point detection, focusing of the photographing lens, and light measurements for the subject brightness, and by turning the second switch (hereafter called 2R) on, an exposure operation is carried out to acquire image data for a subject image based on output of a CCD (Charge Coupled Device) 221 (refer to FIG. 2), as an image sensor.

The mode dial 22 is an operation member constructed capable of rotation, and by aligning a pictorial display or symbol representing an exposure mode provided on the mode dial 22 with an index, it is possible to select respective exposure modes, such as full auto exposure mode (AUTO), program exposure mode (P), aperture priority exposure mode (A), shutter speed priority exposure mode (S), manual exposure mode (M), portrait exposure mode, landscape exposure mode, macro exposure mode, sports exposure mode or night scene exposure mode. The power switch lever 23 is an operation member for turning a power supply of the digital camera on or off, and is constructed to be rotatable between two positions, an on position and an off position. A control dial 24 is an operation member constructed capable of rotation, and it is possible to select desired setting values and modes etc. on an information display screen or the like by rotational operation of the control dial 24.

A rear liquid crystal monitor 26, playback button 27, menu button 28, a cross key button 30, OK button 31, and viewfinder eyepiece section 33 are arranged on a rear surface of the camera body 20. The rear liquid crystal monitor 26 is a display unit for displaying a subject image as a live view display for observation, playback display of subject images that have already been taken, and display of camera information and menus. The display device is not limited to a liquid crystal display as long as it is possible to perform these display operations. It is also possible to construct the monitor so that it is possible to freely change the angle with respect to the camera body 20. The viewfinder eyepiece section 33 is an eyepiece window for observing the subject image, and has an in-viewfinder liquid crystal monitor 29, that will be described later, arranged inside, and it is possible to observe the subject image through this viewfinder eyepiece section 33. The playback button 27 is an operation button for instructing display of subject images, that have been stored after being taken, on the rear liquid crystal monitor 26. In response to operation of the playback button 27, image data of subject images that have been stored in a compression mode, such as JPEG or the like, which will be described later, in a SDRAM 238, that will be described later, or a storage medium 245, is expanded, and the images are displayed on the rear liquid crystal monitor 26.

The cross key button 30 is an operation member for instructing movement of a cursor in two directions, namely an X direction and a Y direction, on the rear liquid crystal monitor 26. Also, the cross key button 30 is used to select playback images, when subject images stored in the storage medium 245 are displayed. Besides providing the cross key button 30 made up of four buttons, namely up, down, left and right, it is also possible to replace with a switch capable of operation in two dimensional directions, such as a touch switch The OK button 31 is an operation member for confirming various items selected by the cross key button 30 and the control dial 24 etc. The menu button 28 is a button for switching to menu mode in order to set various modes of this digital camera. If menu mode is selected by operation of the menu button 28, a menu screen is displayed on the rear liquid crystal monitor 26. The menu screen is comprised of a multiple hierarchical structure, and various items are selected using the cross key 30 and selection is determined by operating the OK button 31.

The release button 21, power switch lever 23, playback button 27, menu button 28, cross key button 30 and OK button 31 are all linked to on/off switches. Signals generated in response to operation of the operating buttons that are linked to these on/off switches, and the mode dial 22 and control dial 24 etc. are sent to switch detection circuits 253 (refer to FIG. 2) inside an ASIC (Application Specific Integrated Circuit) 262.

Figure 2:
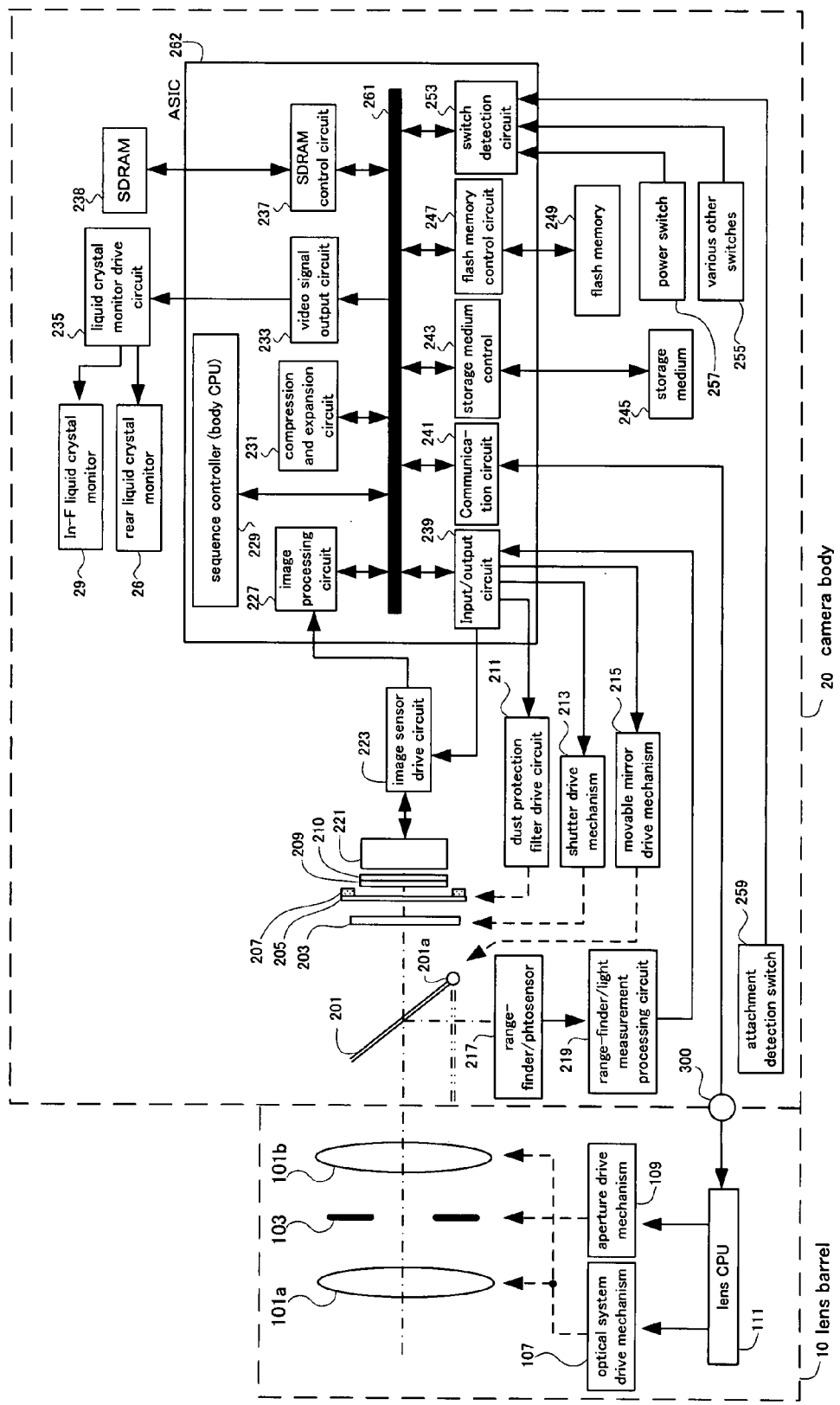
FIG. 2 is a block diagram showing the overall structure of electrical systems of a digital camera of a first embodiment adopting the present invention.

Next, the overall structure principally involved in the electrical systems of the digital camera will be described using FIG. 2. Lenses 101*a* and 101*b* for focal point adjustment and focal length adjustment, and an aperture 103 for adjusting aperture, are arranged inside the lens barrel 10. The lens 101*a* and the lens 101*b* are driven by an optical system drive mechanism 107, while the aperture 103 is connected to as to be driven by the aperture drive mechanism 109. The optical system drive mechanism 107 and the aperture drive mechanism 109 are respectively connected to a lens CPU 111, and this lens CPU 111 is connected to the camera body 20 by means of the communication contact 300. The lens CPU 111 performs control inside the lens barrel 10, controls the optical system drive mechanism 107 to perform focusing and zoom operations, and controls an aperture value by controlling the aperture drive mechanism 109.

A movable reflecting mirror (for the sake of convenience referred to as a movable half-mirror) 201, that has characteristics to transmit some of the luminous flux that has passed through the lenses 101*a* and 101*b* and reflect the remainder, is arranged inside the mirror box inside the camera body 20. This movable half-mirror 201 is driven by a movable mirror drive mechanism 215, and is capable of rotation about an axis orthogonal to the surface of the drawing about a rotational axis 201*a*. When the movable half-mirror 201 is at a position inclined at 45 degrees with respect to the optical path of the lenses 101*a*, 101*b* (the position shown by a solid line in FIG. 2), some of the subject light flux (for example, 30%) is reflected, and guided to a range-finder/photosensor 217 provided in a base section of the camera body 20. Also, the remaining subject light flux (70%) passes through the movable half mirror 201 and is guided in the direction of the CCD 221.

When the movable half mirror 201 is at a retracted position substantially parallel to the optical path of the lenses 101*a*, 101*b* where it does not receive any subject light flux (position shown by the two-dot dashed line in FIG. 2), all of the subject light flux is led to the CCD 221. The construction of this movable half mirror 201 will be described later using FIG. 3. In this embodiment, the rotational center of the movable half mirror 201 is at a lower side inside a mirror box, but this is not limiting and it can also be at the upper side, and obviously it does not matter even if the rotational center is on the left or right side of the lens looking from the front of the camera. Also in this embodiment, the reflectance and transmissivity of the half mirror are respectively 30% and 70%, but this ratio is not limiting and can be appropriately changed.

The range-finder/photosensor 217 is arranged in a base section of the mirror box inside the camera body 20, at a position where light flux reflected by the movable half mirror 201 is guided to it. This range-finder/photosensor 217 comprises a range finding sensor and a photosensor, with the photosensor being made up of multiple photosensors dividing the subject image to perform light measurements Also, the range finding sensor is a sensor for carrying out ranging using a TTL phase contrast method. Output of the range-finder/photosensor 217 is sent to a ranging/light measurement processing circuit 219. The range ranging/light measurement processing circuit 219 outputs evaluated light measurement values based on output of the photosensor, and based on the output of the range finding sensor measures amount of focal point slip of the subject image imaged by the lenses 101*a* and 101*b*. Incidentally, it is also possible for the range finding sensor and the photosensor to be formed separately, or to be formed in an integrated manner.

A focal plane type shutter 203, for exposure time control and shielding the CCD 221 is arranged on the photographing light path, behind the movable half mirror 201 and on the optical axis of the lenses 101*a* and 101*b*, and drive control for this shutter 203 is performed by a shutter drive mechanism 213. A dust protection filter 205 is arranged behind the shutter 203, the dust protection filter being a filter for preventing dust generated in the mount opening section of the camera body and inside the body becoming attached to the CCD 221, and the image sensor and shadows of the dust appearing in the subject image, thus degrading appearance.

A piezoelectric element 207 is fixed to the whole or part of the peripheral edge of the dust protection filter 205, with this piezoelectric element 207 being connected to a dust protection filter drive circuit 211, and driven by this circuit. The piezoelectric element 207 is driven by the dust protection filter drive circuit 211 so that the dust protection filter 205 vibrates at a specified ultrasonic frequency, and any dust attached to the front surface of the dust protection filter 205 is removed using this vibration. Incidentally, as long as it is possible to remove dust that has become attached to the imaging element itself, such as the CCD, or optical elements arranged at the front surface side of the image sensor, use of the ultrasonic vibration as in this embodiment is not limiting, and there is no problem in using various alternative methods as appropriate, such as a method of brushing off dust with air flow using an air pump or the like, or collecting and removing dust using static electricity.

An infrared cut filter 209 for cutting an infrared component from the subject light flux is arranged behind the dust protection filter 205, and an optical low-pass filter 210 for removing high frequency components from the subject light flux is arranged behind the infrared cut filter 209. The CCD 221, as an image sensor, is arranged behind the optical low pass filter 210, and a subject image formed by the lenses 101a and 101b is photoelectrically converted to electrical signals. These components, namely the dust protection filter 205, infrared cut filter 209, optical low pass filter 210 and CCD 211, are housed in an encapsulated state in a package, not shown, constructed so that no dust infiltrates inside the package. In this embodiment, a CCD is used as the image sensor, but this is not limiting and it is also perfectly possible to use a two-dimensional imaging element such as CMOS (Complementary Metal Oxide Semiconductor).

The CCD 221 is connected to an image sensor drive circuit 223, and is drive controlled by control signals from an input/output circuit 239. Photoelectric analog signals output from the CCD 221 are amplified by the image sensor drive circuit 223 and subjected to analog to digital conversion (AD conversion). Also, image signal readout is carried out at a frame rate in accordance with an instruction from a body CPU 229 via the input output circuit 239. The image sensor drive circuit 223 is connected to an image processing circuit 227, and this image processing circuit 227 carries out various image processing such as digital amplification of digital image data (digital gain adjustment processing), color correction, gamma (Y) correction, contrast correction, monochrome/color mode processing, live view image processing etc.

The image processing circuit 227 is connected to a data bus 261. Besides the image processing circuit 227, components that will be described later, such as a sequence controller (hereafter referred to as a body CPU) 229, compression and expansion circuit 231, video signal output circuit 233, SDRAM control circuit 237, input/output circuit 239, communication circuit 241, storage medium control circuit 243, flash memory control circuit 247 and switch detection circuit 253 are connected to this data bus 261.

The body CPU 229 that is connected to the data bus 261 controls operation of this digital camera. The compression and expansion circuit 231 connected to the data bus 261 is a circuit for compressing image data stored in the SDRAM 238 using JPEG; TIFF etc. The image compression is not limited to JPEG and TIFF, and it is also possible to apply other compression methods. The video signal output circuit 233 connected to the data bus 261 is connected via a liquid crystal monitor drive circuit 235 to a rear liquid crystal monitor 26 and an in-viewfinder liquid crystal monitor 29 (abbreviated to in-F liquid crystal monitor in the drawing).

The video signal output circuit 233 converts image data stored in the SDRAM 238 or the storage medium 245 into video signals for display on the rear liquid crystal monitor 26 and/or the in-viewfinder liquid crystal monitor 29. The rear liquid crystal monitor 26 is arranged on the rear surface of the camera body 20, but as long as it is in a position that can be seen by the photographer it is not limited to the rear surface, and also is not limited to liquid crystal and can be another display device. The in-viewfinder liquid crystal monitor 29 is arranged at a position that can be seen by the photographer through the viewfinder eyepiece 33, and similarly to the rear liquid crystal monitor 26 is not limited to liquid crystal and can be another display device. Incidentally, it is also possible to do away with the viewfinder eyepiece 33 and the in-viewfinder liquid crystal monitor 29, and have only the rear liquid crystal monitor 26 for observing subject images.

The SDRAM 238 is connected via the SDRAM control circuit 237 to the data bus 261, and this SDRAM 238 acts as a buffer memory for temporarily storing image data that has been subjected to image processing by the image processing circuit 227 or image data that has been compressed by the compression and expansion circuit 231. The input/output circuit 239 connected to the above described dust protection filter drive circuit 211, shutter drive mechanism 213, movable half mirror drive mechanism 215, ranging/light measurement processing circuit 219 and image sensor drive circuit 223, controls input and output of data to various circuits, such as the body CPU 229 via the data bus 261. The communication circuit 241 that is connected to the lens CPU 111 via the communication contact 300 is also connected to the data bus 261, and carries out data exchange with the body CPU 229 etc. and communication for control commands.

The storage medium control circuit 243 connected to the data bus 261 is connected to the storage medium 245, and performs control of storage such as image data to this storage medium 245. The storage medium 245 is constructed so that any rewritable storage medium, such as xD picture card (registered trademark), compact Flash (registered trademark), SD memory card or memory stick (registered trademark) can be fitted, and is removably inserted into the camera body 20. Besides this, it is also possible to have a structure capable of connecting a hard disk unit, such as a microdrive (registered trademark) or a wireless communication unit.

The flash memory control circuit 247 connected to the data bus 261 is connected to a flash memory 249, and this flash memory 249 stores programs for controlling camera flow, and the body CPU 229 performs control of the digital camera in accordance with the programs stored in the flash memory 249. Incidentally, the flash memory 249 is an electrically rewritable non-volatile memory.

Various switches 255, such as a power switch 257 for turning the camera on and off linking to a power on switch lever 23 for controlling supply of power to the camera body 20 and the lens barrel 10, a switch for detecting a first stroke and a second stroke of the shutter release button 21, a switch linking to the playback button 27 for instructing playback mode, a switch linking to the cross shaped button 30 for instructing movement of a cursor on the screen of the rear liquid crystal monitor 26, a switch linking to the mode dial 22 for instructing exposure modes, an OK switch linking to the OK button 31 for deciding various selected modes etc. and an attachment detection switch 259, are connected to the data bus 261 via a switch detection circuit 253.

Figure 3:
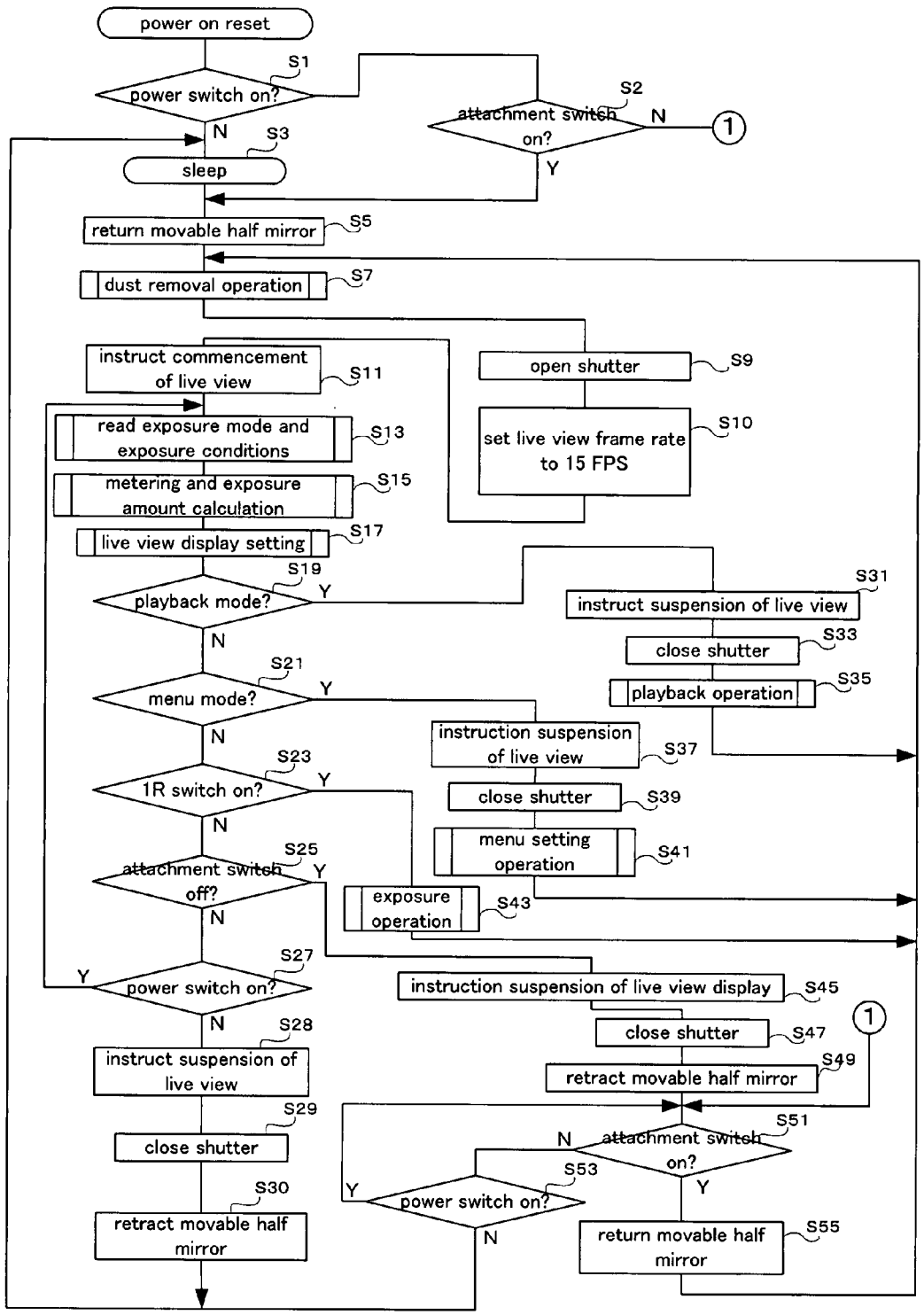
FIG. 3 is a flowchart showing a power-on reset operation of the first embodiment of the present invention.

Next, operation of the digital camera of one embodiment of the present invention will be described using the flowcharts shown in FIG. 3 and FIG. 4. If the power on reset processing flow of FIG. 3 is entered, it is determined whether or not the power switch 257 of the camera body 20 is on (S1). When the result of determination is that the power switch 257 is off, processing advances to step S3 where a sleep state, which is a low power consumption state, is entered. In this sleep state, interrupt processing is carried out only when the power switch 257 is turned on, and processing for power switch on is carried out in steps S5 and after. Until the power switch is turned on, operations other than power switch interrupt processing are suspended, and consumption of the power supply battery is prevented.

In step S1, if the power switch 257 is turned on, processing advances to step S2 where it is determined whether or not the attachment switch 259 is off. The attachment detection switch 259 is off if the lens barrel 10 is removed from the camera body 20. If the result of determination is that the switch 259 is off, namely in the event that the lens barrel 10 is removed, processing advances to step S51, which will be described later. This is because when the power switch lever 23 of the camera body 20 is operated with the lens barrel 10 removed, and the power is on, processing is the same as when the lens is removed. In step S2, if the result of determination is that the attachment detection switch 259 is on, processing advances to step S5 and after, where power switch on processing is carried out.

In step S5, returning of the movable half mirror 201 is carried out. When the power switch 257 is in the off state, the movable half mirror 201 is at a position removed from the photographing light path (state shown by the two-dot dashed line in FIG. 2), and this return operation returns the mirror to the optical path in response to the power switch 257 being turned on to guide the subject light flux from the lens barrel 10 to the range-finder/photo sensor 217 in order to perform light measurement and ranging. Next, the dust removal operation for the dust protection filter 205 is carried out (S7). In this dust removal operation, drive voltage is applied to the piezoelectric element 207 attached to the dust protection filter 205 from the dust protection filter drive circuit 211, and dust is removed using ultrasonic waves, as described previously.

Then, an opening operation for opening the shutter 203 is carried out by the shutter drive circuit 213 (S9). As a result of this opening operation, subject light flux that has passed through the moveable half mirror 201 is not shielded by the shutter 203 and a subject image is formed on the CCD 221. After this, a frame rate for reading out from the CCD 221, that is, a frame rate for live view display, is set to 15 FPS (S10).

At the time of live view display, with this embodiment, the standard frame rate is 30 FPS (frames per second), but in the exposure standby state until the release button 21 is pressed down halfway, it is set to lower than that, namely 15 FPS. In the exposure standby state therefore, it is possible to reduce power consumption. It is also possible for the frame rate to be, for example, 8 FPS or 5 FPS as long as there is a longer cycle than the frame rate in the exposure preparation state. Next, commencement of live view display to give moving image display of a subject image on the rear liquid crystal monitor 26 using image data formed by the CCD 221 is instructed (S11). Incidentally, control of the live view display operation is carried out by the image processing circuit 227 receiving this commencement instruction.

Next, if there is information such as exposure mode set by the mode dial 22, ISO sensitivity, shutter speed set manually or aperture value, these exposure conditions are read in (S13). Subject brightness is then measured by the range finder/photosensor 217, and exposure amount is calculated based on this subject brightness. Exposure control values such as shutter speed and aperture value are calculated in accordance with exposure mode and exposure conditions, using this calculated exposure value (S15). Next, live view display setting is carried out using the light measurement values and exposure amount etc. (S17). In this step, in order to carry out condition setting for electronic shutter speed and sensitivity when driving the CCD 221, calculation and setting is carried out in order to display an image having an appropriate brightness on the rear liquid crystal monitor 26 or the in-viewfinder liquid crystal monitor 29 using results of calculation for light measurement and exposure amount obtained in step S15, or a previous display image.

Next, processing advances to step S19 where determination as to whether or not playback mode is in effect is carried out. This playback mode is a mode for reading out still images stored in the storage medium 245 and displaying them on the rear liquid crystal monitor 26 and/or the in-viewfinder liquid crystal monitor 29, when the playback button 27 has been operated. If the result of determination is that playback mode has been set, processing advances to step S31, and suspension of live view display is instructed to the image processing circuit 227. If this is done, the shutter 203 is closed, and while the shutter is closed a shutter charge operation is carried out for the next shutter opening operation (S33).

Next, still image data stored in the storage medium 245 is read out, image data is expanded by the compression and expansion circuit 231, and the still image is playback displayed on the rear liquid crystal monitor 26 of the in-viewfinder liquid crystal monitor 29 by means of the video signal output circuit 233 and the liquid crystal monitor drive circuit 235 (S35). When the release button 21 is pressed down, or any other manual operation is carried out during the playback operation, playback operation is terminated and processing returns to step S7 and the previously described operations are repeated.

In step S19, if the result of determination is that playback mode has not been set, processing advances to step S21 where it is determined whether or not menu mode is set. This is determination as to whether or not the menu button 28 has been operated and the menu mode set. If the result of determination is that menu mode has been set, then similarly to the case where playback mode was set, a live view suspension instruction is output (S37) and a close instruction is output to the shutter 203 (S39). When closing the shutter, similarly to step S33, a shutter charge operation is carried out. After that, the menu setting operation is carried out (S41). Various setting operations such as white balance, ISO speed setting, drive mode setting etc. are carried out by the menu setting operation. If the menu setting operation is completed, processing returns to step S7 and the operations described above are repeated.

In step S21, if the determination result is that menu mode has not been set, processing advances to step S23 where it is determined whether or not the release button 21 has been pressed down halfway, that is, whether or not the 1R switch is on. If the result of determination is that the IR switch is on, processing advances to step S43 where an exposure operation sub-routine is executed to carry out exposure preparation and exposure. This sub-routine will be described in detail later using FIG. 5. If the exposure operation sub-routine is completed, processing returns to step S7 and the steps described above are repeated.

In step S23, if the result of determination is that the 1R switch is off, processing advances to step S25 where, similarly to step S2, it is determined whether or not the attachment detection witch 259 is off. If the lens barrel 10 is detached then similarly to steps S31 and S33 for playback mode a live view suspension instruction is output (S45), and a close operation for the shutter (S47), and in consequence a shutter charge operation, are carried out. After that, an operation to retract the movable half mirror from the optical path is carried out (S49). The retract operation is carried out by causing a mirror frame to rotate, against the force of an opening spring, from the exposure optical path to a retracted position (position shown by the two-dot dashed line in FIG. 2 and FIG. 3), by driving a motor to rotate a mirror cam.

If the retraction of the movable half mirror 201 is completed, or it has been determined in step S2 that the attachment detection switch 259 is off (that is, the lens barrel 10 is removed), processing advances to step S51 where it is determined whether or not the attachment detection switch 259 is on. After it has been detected in step S25 that the lens barrel 10 was detached, it is also determined whether or not the lens barrel 10 has been re-attached. If the result of determination is that the lens barrel 10 has been attached, processing advances to step S55 where the movable half mirror 201 is returned. This is, as previously described, driving the motor to rotate a mirror cam, against the force of an opening spring, rotating a stop lever in a clockwise direction using the cam surface, and placing the mirror frame into the optical path of the lenses 101*a* and 101*b*. If return of the movable half mirror is completed, processing returns to step S7 and the above described steps are repeated.

If the result of determination in step S51 is that the attachment detection switch 259 is off, processing advances to step S53 where it is determined whether or not the power switch 257 is on. If the lens barrel 10 is detached and the power switch 257 is on, even if various operating buttons are operated the mount opening section remains open, and so camera operations are not carried out from the viewpoint of stopping erroneous operations. Therefore, a standby state is entered for repeatedly determining a lens 10 attachment state in step S51, and a power switch lever 23 operation state in step S53. If it is determined in step S53 that the power switch 257 is off, processing returns to step S3, and a sleep state is entered. Incidentally, it is always possible to modify the processing such as, if it is detected in step S51 that the lens barrel 10 is still detached, omit the determination if step S53 and advance to step S3 and enter the sleep state, or advance to step S9 and carry out processing based on operations by various operating buttons.

If the result of determination in step S25 is that the attachment detection switch 259 is on, that is, that the lens barrel 10 is fitted to the camera body, processing advances to step S27 where it is determined whether or not the power switch 257 is on. If the result of determination is that the switch 257 is on, processing returns to step S13 and the above described steps are repeated. After live view display has commenced in step S11, unless various operation buttons etc. are operated in steps S19 and later, subject light flux that has passed through the movable half mirror 201 is unimpeded by the shutter 203, and therefore a subject image is formed on the CCD 221. Image date image formed by the CCD 221 is made into a moving image for live view display on the rear liquid crystal monitor 26 and/or the in-viewfinder liquid crystal monitor.

If it is determined in step S27 that the power switch 257 is off, then, similarly to steps S31 and S33, an instruction to suspend live view display is issued to the image processing circuit 227 (S28), and an operation to close the shutter 203 is carried out (S29). At the time of this shutter close operation, a shutter charge operation is also carried out. After that, similarly to step S49 described previously, once the retract operation for the movable half mirror 201 is completed (S30), step S3 is returned to and the sleep state entered.

In this manner, in this embodiment, with the digital camera capable of live view display the movable half mirror 201 is placed in the exposure optical path when the power is turned on, and some of the subject light flux is reflected to the range finder/photo sensor 217, which gives the advantage that it is possible to carry out range finding and light measurement as soon as the power is switched on.

Next, the exposure operation sub-routine of step S43 will be described using FIG. 4. As previously mentioned, this sub-routine is executed if the release button 21 is pressed down halfway. First of all, ranging and automatic focal point adjustment are carried out (S71). At the time this ranging and automatic focal point adjustment are carried out, the movable half mirror 201 is placed in the exposure optical path, and some of the subject light flux is reflected to the rage finder/photosensor 217. Using this subject light flux, the range finer/photosensor 219 and body CPU 229 etc. detect focal point deviation of the lenses 101a and 101b using a TTL phase contrast method, and drive the lenses 101a and 101b to focus positions using the optical system drive mechanism 107 by means of the lens CPU 111 based on the detected focal point deviation amounts. After drive to the focus positions, ranging is again carried out using the ranging/photosensor 217 and the ranging/light measurement processing circuit 219, and ranging and focus drive operations are repeated until it is confirmed that the focus positions have been reached.

Next, light measurement/exposure amount calculation is carried out (S73). When carrying out light measurement/exposure amount calculation, subject light flux reflected by the movable half mirror 201 is received by the ranging/photosensor 217, and so the ranging light measurement processing circuit 219 can detect subject brightness BV by processing output of the ranging/photosensor 217. The body CPU 229 obtains exposure amount EV using this subject brightness BV, and also obtained exposure conditions such as shutter speed and aperture value in accordance with the exposure mode. Then, in step S74, the live view frame rate is changed to 30 FPS. Change of the frame rate for live view display is carried out after completion of the focus operations and light measurement calculations of step S71 and S73, and is advantageous in that focus operations and light measurement calculations can be carried out sooner.

Next, it is determined whether or not the release button has been pressed down fully, namely, whether or not the 2R switch is on (S75). If the result of determination is that the switch is off, processing advances to step S77 where it is determined whether or not the 1R switch is on. By pressing the release switch 21 down fully, the exposure operation sub-routine is jumped to, and when the release button 21 is kept pressed down halfway a standby state is entered where determination is repeatedly carried out in steps S75 and S77. If the photographer's finger is taken off the release button 21 and the 1R switch is off, the power on reset step S9 is returned to.

In step S75, if the result of determination is that the 2R switch is on, namely that the release button 21 has been pressed down fully, processing transfers to an exposure operation for acquiring a still image. First of all, in step S79, an instruction to suspend live view display is output to the image processing circuit 227. The reason for this is so as to prevent the live view image on the rear liquid crystal monitor 26 and/or the in-viewfinder liquid crystal monitor 29 becoming unpresentable with the occurrence of disturbance in the subject image incident on the CCD 221 due to the operation of moving the movable half mirror 201 to the retracted position, opening and closing of the shutter 203, etc. at the time of still image acquisition. Next, similarly to step S49, a retraction operation of the movable half mirror 201 is carried out (S81).

The aperture 103 is then closed down until it reaches a set aperture value, or the aperture value calculated in S73, by means of the lens CPU 111 using the aperture drive mechanism 109. If the aperture closing operation is completed, the exposure operation is then carried out by the CCD 221 (S85). Specifically, since the movable half mirror 201 is moved to a retracted position, all of the subject light flux that has passed through the lenses 101a and 101b is formed into an image on the CCD 221. In this state, reset of the electronic shutter of the CCD 221 is released, and charge accumulation of photoelectric conversion current commences. If a time that has been previously set manually or the exposure time set in step S73 elapses, the electronic shutter of the CCD 221 stops charge accumulation for a photoelectric conversion signal. Incidentally, the exposure operation of step S85 controls exposure time using an electronic shutter of the CCD 221, but this is not limiting and it is also possible to control exposure time using the shutter 203. In this case, before commencement of the exposure operation it is necessary to temporarily move the front curtain and rear curtain of the shutter 203 to initial positions.

An operation of closing the shutter 203 and a corresponding shutter charge operation are then carried out (S87), and an instruction to open up the aperture 103 is output to the CPU 111 (S89). It is also possible to carry out the shutter charge in parallel with the opening up of the aperture 103. Also, read out is performed of image signals for electric charge stored in the CCD 221 (S91) and image processing is carried out by the image processing circuit 227 etc. (S93). After carrying out processing such as signal compression in the compression and expansion circuit 231, image data is stored in the storage medium 245 (S95). If storing of the image data is completed, in step S97 it is determined whether or not the 1R switch is on, that is, whether or not the release button 21 is in the half-pressed state. If the 1R switch is off, processing advances to step S97 where the movable half mirror 201 is returned, similarly to step S55. Once the returning operation is complete, the power on reset routine is returned to.

With this embodiment, in step S1 before commencing live view display, the frame rate for live view display is set to a longer cycle than the exposure frame rate, which means that it is possible to reduce power consumption in the exposure standby state. Also, if the release button 21 is pressed down half way to enter exposure preparation, then in step S74 the exposure frame rate is switched, in other words, the frame rate is set to a shorter cycle than in the exposure standby state, and so it is also possible to change the live view display following movement of the subject which should lead to missing less photo opportunities. If the consumption current of the digital camera is reduced across the board, there is a potential problem that photo opportunities will be lost, but since frame rate is lowered in the exposure standby state where there is unlikely to be any framing of the subject image, and increased in the exposure preparation state where framing will be carried out, the above described problem is deftly coped with.

Also, with this embodiment, switching of the frame rate in step S74 is performed after ranging and automatic focal point adjustment operations in step S71. The automatic focal point adjustment operation involves photographing lens drive, and since power consumption is high it is not preferable to increase the frame rate at the same time as this operation. With this embodiment therefore, even if entering the exposure preparation operation the frame rate is set to a high value after completion of the automatic focal point adjustment operation. Also, similarly, frame rate setting is carried out after waiting for completion of light measurement operations.

Further, with this embodiment the power on reset routine is returned to after the exposure operation, and in step S10 the frame rate is lowered, that is, changed to a longer cycle, which means that after the exposure operation a low power consumption mode is entered again.

Incidentally, with this embodiment the CCD 221, as the image sensor, receives light that has passed through the movable half mirror 201 and the range finder/photosensor 217 receives light that has been reflected by the movable half mirror 201, but it is also possible to have a structure where this is reversed and the CCD 221 receives reflected light and the range finder/photosensor 217 receives passed light. Also, subject light flux is divided between the CCD 221 and the range finder/photosensor 217 using the movable half mirror 201, but it is perfectly acceptable to respectively lead subject light flux as required using a fully reflecting mirror.

Further, in this embodiment, the image sensor is only the CCD 221, but this is not limiting and it is also possible to arrange an image sensor inside the viewfinder optical system, in addition to the CCD 221, and to perform live view display utilizing both of the image sensor for recording (CCD 221) and the image sensor inside the viewfinder optical system, or by switching between either one of them.

Figure 5:
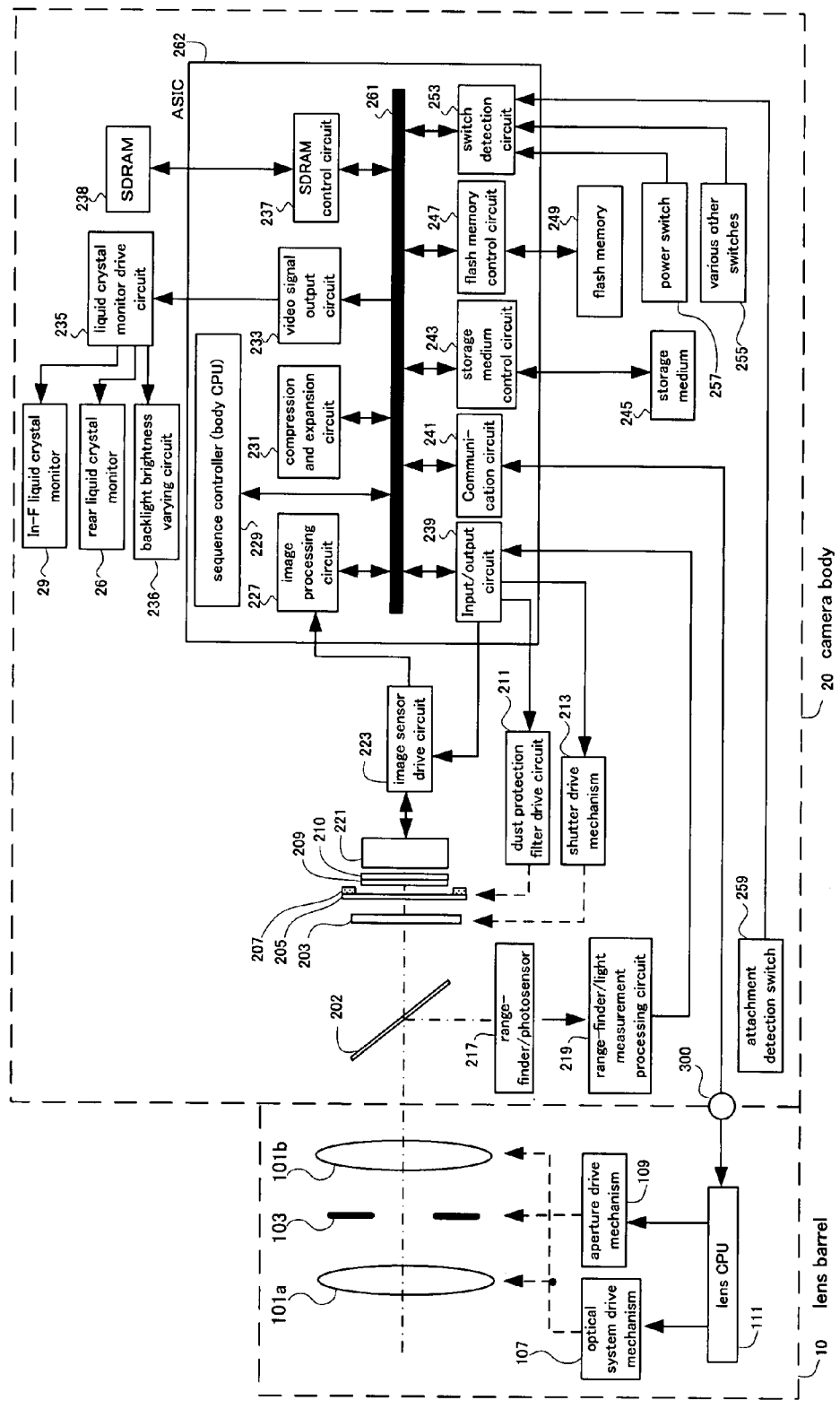
FIG. 5 is a block diagram showing the overall structure of electrical systems of a digital camera of a second embodiment adopting the present invention.
Figure 6:
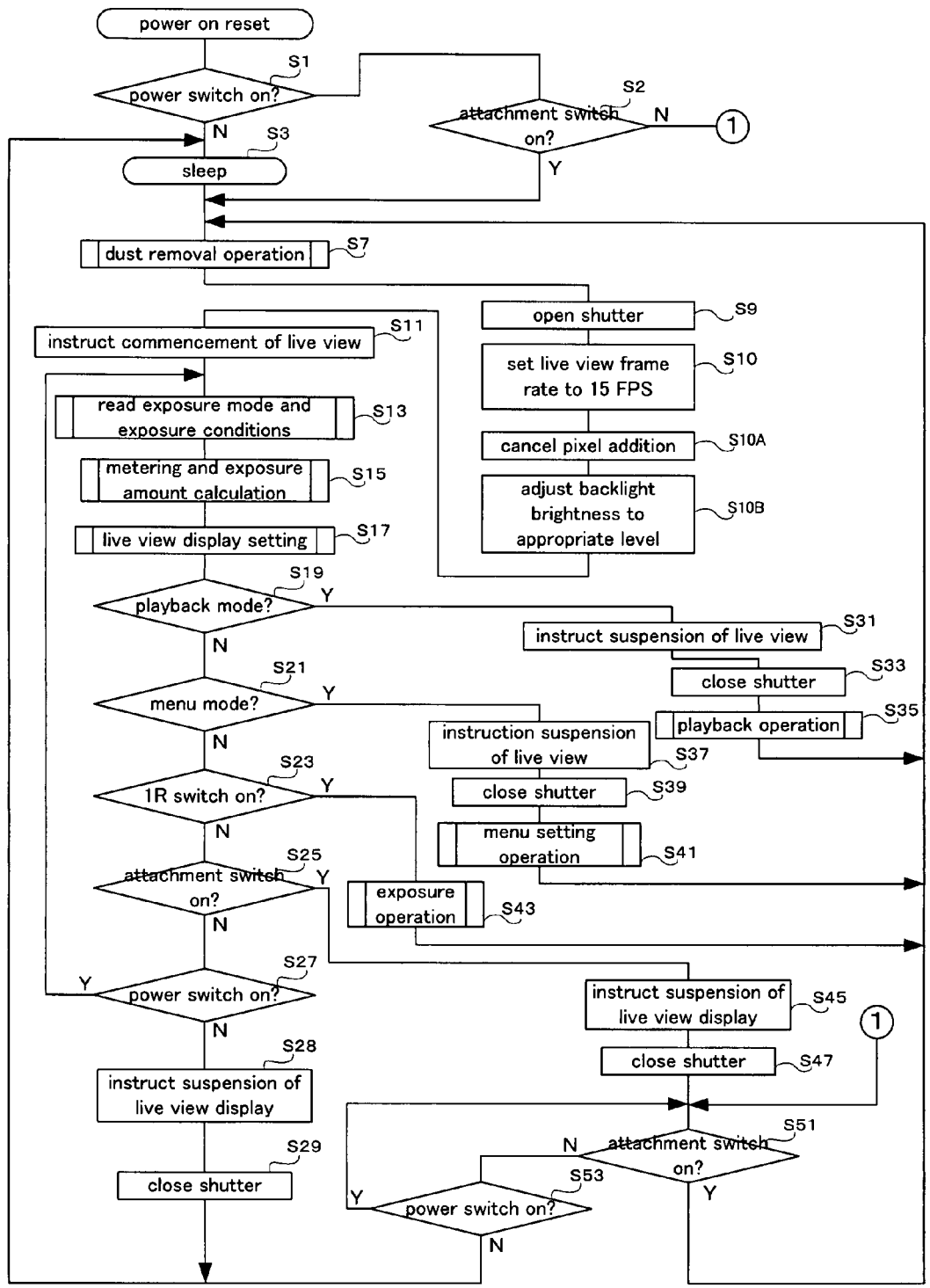
FIG. 6 is a flowchart showing a power-on reset operation of the second embodiment of the present invention.

Next, a second embodiment of the present invention will be described using FIG. 5 to FIG. 7. In the first embodiment of the present invention, the movable half mirror 201 is freely rotatable about the rotational axis 201a, and for live view display the movable half mirror 201 is placed on the optical axis of the photographing lenses 101a and 101b, and when carrying out an exposure operation using the CCD 221 the mirror is retracted from the optical axis of the photographing lenses 101a and 101b. In the second embodiment of the present invention, this movable half mirror 201 is replaced with a fixed mirror section 202. In the following, the second embodiment of the present invention will be described centering on the points of difference, with members that are the same as in the first embodiment being assigned the same reference numerals, and detailed description of those members omitted.

The structure of the second embodiment of the present invention will be described using the circuit block diagram shown in FIG. 5. As described above, a mirror section 202 is arranged in place of the movable half mirror 201, but other than this the only differences from the first embodiment are that the movable mirror drive mechanism 215 is omitted in line with this change regarding the mirror, and the backlight brightness varying circuit 236 is provided.

The mirror section 202 is arranged inside the mirror box inside the camera body 20, has optical characteristics to transmit some of the light flux that has passed through the lenses 101a and 101b and reflect some of the light flux, and is constructed using a pericle mirror, or the like. Incidentally, the mirror section 202 reflects part (for example 30%) of the subject light flux and passes part (for example 70%), but similarly to the first embodiment is possible for the ratio of reflected light to passed light to have various values. Also, in FIG. 5 the mirror section 202 is arranged so that subject light flux is reflected downwards in the mirror box, but this is not limiting and it is also possible to arrange the mirror section 202 so that the subject light flux is reflected upwards or to the left or right.

Also, the backlight brightness varying circuit 236 is a circuit for controlling the brightness of a backlight unit (not shown) arranged on the rear surface of the rear liquid crystal monitor 26, and is connected to the liquid crystal monitor drive circuit 235. The body CPU 229 outputs brightness instruction signals for the backlight unit to the backlight brightness varying circuit 236 via the video signal output circuit 233 and the liquid crystal monitor drive circuit 235, and the backlight brightness varying circuit 236 varies the brightness accordingly.

Operation of the second embodiment of the present invention having this type of structure will be described using the flowcharts shown in FIG. 6 and FIG. 7. The flowchart of FIG. 6 corresponds to the power on reset routine of the first embodiment shown in FIG. 3. Points of difference from the first embodiment are that the returning and retracting operations of the movable half mirror 201 in steps S5, S30, S49 and S55 are obviated by the provision of the fixed mirror section 202 in this embodiment instead of the movable half mirror 201.

Also, in this embodiment, if the release button is pressed down halfway and the exposure operation entered, in the case of low brightness pixel addition is carried out when reading out image signals from the CCD 221. Also, brightness of the backlight unit of the rear liquid crystal monitor 26 is adjusted so as to be appropriate.

Specifically, in step S10, if the live view frame rate is set to 15 FPS, pixel addition cancellation is carried out next (S10A). As will be described later in the exposure operation subroutine shown in FIG. 7, in the case of low brightness, pixel addition is carried out in step S73B. In this step S10A, since there are cases where pixel addition remains set, cancellation of pixel addition is carried out in this step. In the case of low brightness, in the event that brightness increase of the image sensor is carried out instead of, or together with, the pixel addition, the brightness increase is cancelled in this step.

If pixel addition cancellation is completed, then the brightness of the backlight is made an appropriate brightness next (S10B). The rear liquid crystal monitor 26 is difficult to see if the surroundings are bright, and so the brightness of the backlight unit is adjusted to be appropriate according to the brightness of the surroundings. Incidentally, brightness of the surroundings is obtained based on results of light measurement and exposure value calculation obtained in step S15, but alternatively it is also possible to obtain the brightness of the surroundings based on, for example, an image signal detected by the image sensor. The remaining steps shown in FIG. 6 are the same as for the first embodiment and the same steps have the same reference numerals, with detailed description thereof being omitted.

Figure 4:
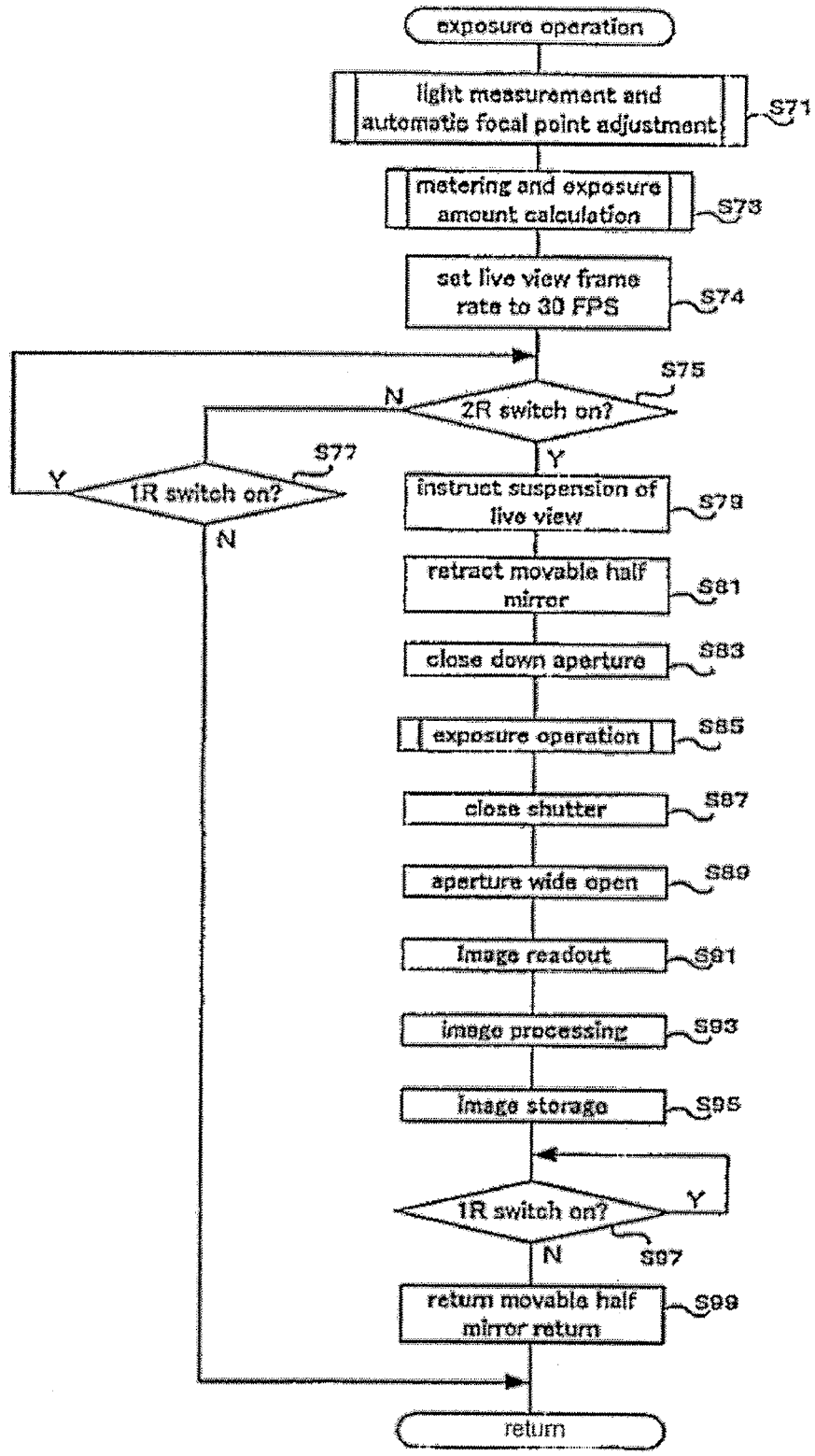
FIG. 4 is a flowchart showing an exposure operation of the first embodiment of the present invention.
Figure 7:
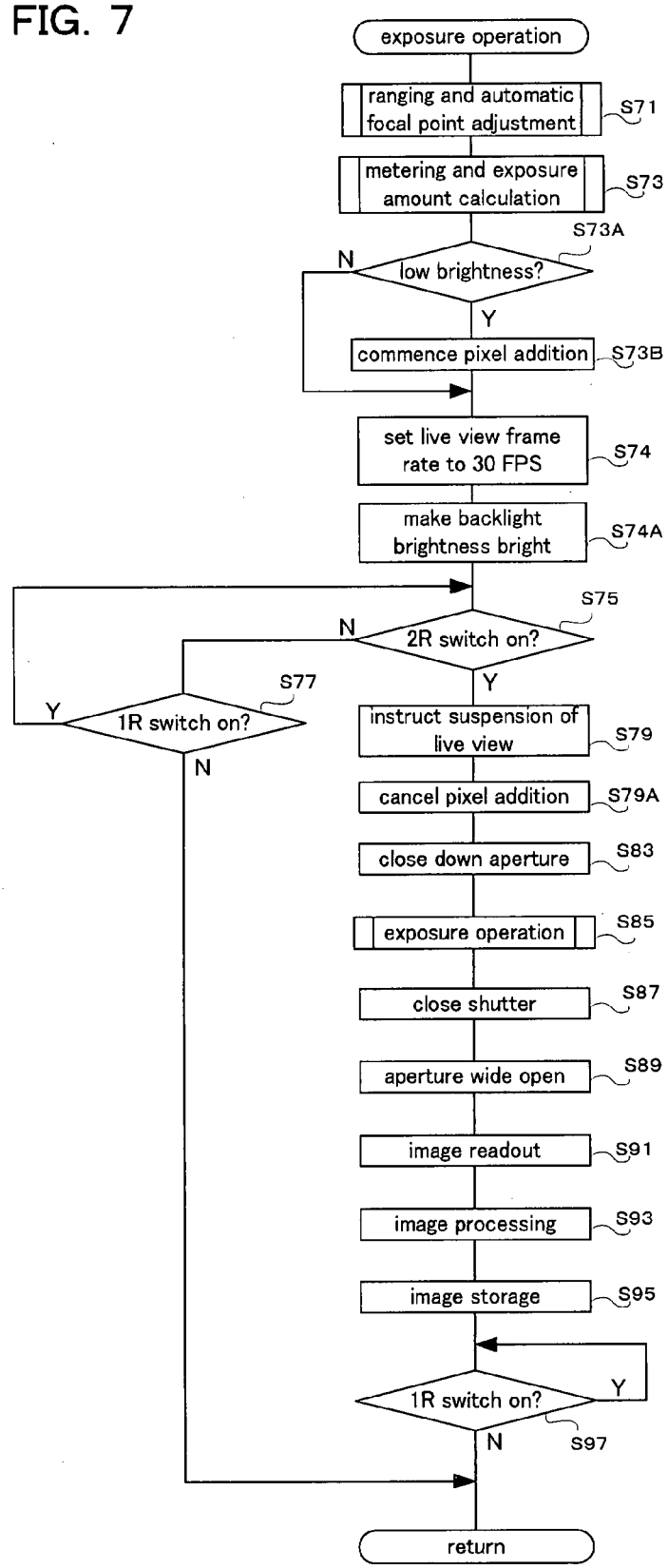
FIG. 7 is a flowchart showing an exposure operation of the second embodiment of the present invention.

Next, the flowchart shown in FIG. 7 is analogous to the exposure routine of the first embodiment shown in FIG. 4. Therefore, the same steps have the same reference numbers and detailed description there of is omitted, with description centering on points of difference. Points of difference from the first embodiment are that steps S73A, S73B and S79A relating to pixel addition have been added, step S74A relating to brightness control of the backlight unit is added, and steps S81 and S99 have been omitted due to the provision of the mirror section 202 instead of the movable half mirror 201.

The processing flow of the exposure operation of FIG. 7 is entered, and in step S73A determination as to whether or not brightness is low is carried out based on light measurement results in step S73. In this embodiment, whether or not brightness is low is determined with EV (exposure value)=5 (for example, ISO 100, aperture value F2.8, shutter speed 0.25 seconds) as a determination level, but this is not limiting and it can be selected as appropriate. If the result of determination is that brightness is higher than a specified value, step S73B is skipped and processing advances to step S74. On the other hand, if the result of determination is that brightness is lower than a specified value, pixel addition is commenced in step S73B. Incidentally, instead of this pixel addition, or together with the pixel addition, it is also possible to carry out brightness increase for the CCD 221, as the image sensor. It is also possible to determine whether or not the image signal of the CCD 221 is less than a specified level when determining whether or not brightness is low in step S74.

As described previously, the mirror section 202 reflects some of the subject light flux, which means that subject light flux reaching the CCD 221, being the image sensor, tends to be reduced. Particularly in the case where the subject field is low brightness, it may not be possible to acquire sufficient image signals, and so in this embodiment pixel addition is carried out so as to maintain a fixed image signal level. What is meant by pixel addition is, with an image signal output of the image sensor, adding outputs of surrounding pixels, for example 2×2, 3×3, to derive a pixel output.

After this, in step S74, the frame rate for live view is set to 30 FPS and then the brightness of the backlight is made bright (S74A). The exposure operation flowchart shown in FIG. 7 has an exposure preparation operation when the release button is pressed down halfway, and therefore the photographer is in a state of observing the liquid crystal monitor 26. When the surroundings are bright, it is difficult to observe the subject image of the liquid crystal monitor 26, and so in this step S74A the brightness of the backlight unit is set brightly by the backlight brightness varying circuit 236, and observation is made easy. It is also perfectly acceptable for cancellation of pixel addition to be carried in step S75 if the 2R switch is turned on, before instructing suspension of live view.

If the release switch is pressed down fully in step S75 and live view suspension instruction is carried out in step S79, pixel addition is then cancelled (S79A). In step S73B, in the case of low brightness, pixel addition is commenced, so that even if the subject is dark a bright image is obtained, but when a release operation is performed and image acquisition is carried out the pixel addition is cancelled to read out the output of each pixel of the CCD 221.

The flowcharts of FIG. 6 and FIG. 7 have mostly the same steps as the first embodiment, and so only the outline of these processing flows will be described. First of all, the camera body 20 is fitted with a power source battery, and if the power on reset routine is entered and the same steps as the first embodiment are followed, in step S10 the frame rate for live view display is set to 15 FPS. Then, after carrying out pixel addition cancellation (S10A), the backlight brightness is controlled to a suitable level (S10B). After this, live view display is commenced (S11), and the operations of exposure mode/ exposure conditions reading (S13), light measurement/exposure amount calculation (S15) and live view display setting (S17) are sequentially carried out.

Next, it is respectively determined if it is playback mode (S19), menu mode (S23), if the 1R switch is on (S23), if the attachment switch is off (S25), and if the power switch is on (S27), and processing is carried out according to the results of determination. In the event that the 1R switch is still on, ranging and automatic focal point adjustment are carried out (S71), followed by light measurement/exposure amount calculation (S73). After this, it is determined based on the results of determination whether or not the brightness is low (S73A), and if the brightness is low pixel addition is carried out (S73B), and the image brightness of the display image on the liquid crystal monitor 26 is improved.

Next, the live view frame rate is set to 30 FPS (S74), to improve ability to track the subject image. Also, the brightness of the backlight unit is set brightly by the backlight brightness varying circuit 236 (S74A), and the display image of the liquid crystal monitor 26 is made bright.

After that, in steps S75 and S76, a release button operation state is determined, and if the release button is pressed down fully and exposure carried out the first thing to occur is suspension of live view display (S79), followed by cancellation of pixel addition (S79A). As a result, signals are output from the CCD 221, being the image sensor, for each pixel without being added. Continuing on, an aperture closing down (S83), exposure operation (S85), shutter close operation and shutter charge operation (S87), and aperture opening operation (S89) are carried out in the same order as with the first embodiment. Readout of image signals for the subject image acquired by the exposure operation is then carried out (S91), image processing (S93) and image storage (S95) are performed, and if the 1R switch is turned off the power on reset routine is returned to.

In this way, with the second embodiment of the present invention also, the frame rate for live view display before entering the exposure operation is set smaller (a longer cycle) than after entering the exposure operation. As a result it is possible to lower power consumption before entering the exposure operation, and it is possible to display a subject image tracking a moving subject once the exposure operation is entered.

Also, in the second embodiment of the present invention, as well as changing the frame rate for live view display, in the event that the subject field is of low brightness, pixel addition is carried out for the image sensor (steps S73A, S73B). In the case of using a mirror section 202 with optical characteristics such that some of the subject light flux is reflected while the remainder is passed, there is a danger of the amount of subject light flux reaching the image sensor being reduced. However, even in this case, it is possible to acquire image signals of a sufficient level by pixel addition, and even if the surroundings are dark, it is possible to ensure the screen brightness of the liquid crystal monitor 26.

Further, in the second embodiment of the present invention, brightness of the backlight unit of the liquid crystal monitor 26 is made bright when entering the exposure operation (74A). It is therefore made easy for the photographer to view the liquid crystal monitor 26, and when the possibility of the photographer viewing the liquid crystal monitor 26 is low when not in an exposure operation it is possible to prevent consumption of the power source by lowering the brightness of the backlight.

In the second embodiment, when determining whether or not the brightness is low in step S73A, the results of light measurement based on the output of the range finder/photosensor 217 are used in step S73, but this is not limiting and it is of course possible to acquire light measurement results based on output of the CCD 221.

Also, the pixel addition of step S73B in the second embodiment is pixel addition when reading out pixels of the CCD 221, but this is not limiting and it is also possible to carry out pixel addition processing, in the image processing circuit 227 etc., after temporary readout for all pixels.

Further, the backlight brightness varying circuit 236 is controlled so as to vary the backlight of the rear liquid crystal monitor 26, but this is not limiting and it is also possible to similarly control the backlight of the in-viewfinder liquid crystal monitor 29.

Having a similar structure to the first embodiment, the second embodiment also achieves the same effects, and modifications can be implemented. With each of the embodiments of the present invention, the invention has been applied to a general digital camera, but this is not limiting and it is also possible apply the invention to a photographing unit inside various devices such as a mobile phone, and also to attach a bellows or extension tube etc., and can also be applied to a dedicated camera attached to various devices such as microscope or binoculars. It is possible to apply the present invention to any camera capable of live view display of a subject on a monitor unit and capable of storing the image.

What is claimed is:

1. A digital camera, comprising:
   an imaging section for acquiring a subject image;
   an image processing section for processing signals output from the imaging section and generating image data;
   a display section for displaying image data generated by the image processing section, and the display section has a backlight brightness varying section; and
   a control section for controlling the imaging section, the image processing section and the display section to carry out live view display, wherein the control section performs control so as to carry out the live view display at a first update cycle until a release button is pressed down halfway, and carry out the live view display at a second update cycle that is shorter than the first update cycle when the release button is pressed down halfway, and the control section performs control so that the backlight brightness of the display section is made bright in accordance with the live view display being changed from the first update cycle to the second update cycle.

2. The digital camera of claim 1, wherein the control section shortens the update cycle of the live view display by changing an imaging cycle of the imaging section from a first imaging cycle to a second imaging cycle that is shorter than the first imaging cycle.

3. The digital camera of claim 1, wherein the control section executes an automatic focal point adjustment operation or a light measurement operation in response to an operation of pressing the release button down halfway, or an exposure operation in response to an operation of pressing the release button down fully.

4. The digital camera of claim 3, wherein the control section performs control so that the live view display is changed from the second update cycle to the first update cycle if the operation of pressing the release button down halfway is cancelled.

5. The digital camera of claim 3, wherein control is performed so that the live view display is changed from the second update cycle to the first update cycle if the exposure operation is completed.

6. The digital camera of claim 1, wherein the image processing section performs pixel addition processing on output signals of the imaging section when the subject field is of low brightness.

7. The digital camera of claim 1, wherein the backlight brightness varying section makes an appropriate brightness of the backlight during carrying out live view display at the first update cycle.

8. A digital camera control method for repeatedly imaging a subject image, and carrying out live view display on a display section using the repeated imaging, wherein
   the live view display is carried out on the display section at a first update cycle until a release button is pressed down halfway, and the live view display is carried out at a second update cycle that is shorter than the first update cycle when the release button is pressed down halfway, and the backlight brightness of the display section is made bright in accordance with the live view display being changed from the first update cycle to the second update cycle.

9. The digital camera control method of claim 8, wherein an automatic focal point adjustment operation or a light measurement operation are executed in response to an operation of pressing the release button down halfway, and an exposure operation is executed in response to an operation of pressing the release button down fully.

10. The digital camera control method of claim 9, wherein the update cycle of the live view display is made longer if the exposure operation is completed.

11. The digital camera control method of claim 8, wherein the update cycle of the live view display is made longer if the operation of pressing the release button down halfway is cancelled.

* * * * *